United States Patent
Thetford et al.

(10) Patent No.: US 9,018,302 B2
(45) Date of Patent: Apr. 28, 2015

(54) DISPERSANT COMPOSITION

(71) Applicant: Lubrizol Advanced Materials, Inc., Cleveland, OH (US)

(72) Inventors: Dean Thetford, Blackley (GB); Elliot Coulbeck, Blackley (GB); Patrick J. Sunderland, Blackley (GB)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 14/352,352

(22) PCT Filed: Oct. 25, 2012

(86) PCT No.: PCT/US2012/061826
§ 371 (c)(1),
(2) Date: Apr. 17, 2014

(87) PCT Pub. No.: WO2013/063209
PCT Pub. Date: May 2, 2013

(65) Prior Publication Data
US 2014/0288227 A1    Sep. 25, 2014

Related U.S. Application Data

(60) Provisional application No. 61/551,656, filed on Oct. 26, 2011.

(51) Int. Cl.
   *C09D 7/02* (2006.01)
   *C09D 17/00* (2006.01)
   *B01F 17/00* (2006.01)
   *C08K 11/00* (2006.01)

(52) U.S. Cl.
   CPC ........... *C09D 7/02* (2013.01); *C09D 17/002* (2013.01); *B01F 17/0028* (2013.01)

(58) Field of Classification Search
   CPC .......... C09D 7/02; C09D 17/00; C08K 11/00; C09B 67/00
   USPC ................... 524/556, 543, 833, 502
   See application file for complete search history.

(56) References Cited

U.S. PATENT DOCUMENTS

| 4,281,071 | A |  | 7/1981 | Fearing et al. |
| 5,130,463 | A |  | 7/1992 | Haubennestel et al. |
| 5,187,229 | A |  | 2/1993 | Yamamoto et al. |
| 5,244,979 | A |  | 9/1993 | Yamamoto et al. |
| 5,300,255 | A |  | 4/1994 | Campbell et al. |
| 5,476,885 | A |  | 12/1995 | Tahara et al. |
| 5,840,114 | A |  | 11/1998 | Jeknavorian et al. |
| 6,051,627 | A |  | 4/2000 | Thetford et al. |
| 6,326,449 | B1 | * | 12/2001 | Haldankar .............. 526/310 |
| 2002/0019472 | A1 | * | 2/2002 | Yamashita et al. ....... 524/430 |
| 2002/0132890 | A1 | * | 9/2002 | Ramesh et al. ........... 524/236 |

FOREIGN PATENT DOCUMENTS

| DE | 3325738 | 3/1985 |
| EP | 0879860 A2 | 11/1998 |
| EP | 1061089 | 12/2000 |
| EP | 2065403 | 6/2009 |
| EP | 2208761 | 7/2010 |
| GB | 887241 | 1/1962 |
| WO | 2007138254 | 12/2007 |
| WO | 2010127809 | 11/2010 |

OTHER PUBLICATIONS

Written Opinion of the Corresponding International Application No. PCT/US2013/063209 dated May 27, 2013.
Search Report of the Corresponding International Application No. PCT/US2013/063209 dated May 27, 2013.
Corresponding International Publication No. WO2013/063209 A1 Published May 2, 2013.

* cited by examiner

*Primary Examiner* — Michael M Bernshteyn
(74) *Attorney, Agent, or Firm* — Teresan W. Gilbert, Esq.; David M. Shold, Esq.

(57) ABSTRACT

A composition comprising particulate solid (typically a pigment or filler), an organic medium (typically the organic medium may be a plastics material or an organic liquid) and a polyacrylic-acid-containing copolymer.

15 Claims, No Drawings

DISPERSANT COMPOSITION

FIELD OF INVENTION

The invention relates to a dispersant composition and more specifically a dispersant for a composition containing a particulate solid, an organic medium, and a polyacrylic-acid containing copolymer. The invention further relates to novel compounds, and the use of the polyacrylic-acid-containing copolymer as a dispersant.

BACKGROUND OF THE INVENTION

Mineral fillers such as calcium carbonate are commonly added to a plastic material (such as unsaturated polyester resins) to provide reinforcement, increase hardness and to lower overall formulation cost. Other mineral fillers such as alumina trihydrate, which endothermically decompose upon heating to liberate water, are known to have a flame retardant effect in plastic materials such as unsaturated polyester composites. However, adding a significant amount of filler the overall viscosity of the system generally increases. Dispersing agents are commonly used to wet out the dry filler during mixing, reduce the viscosity and make the formulation more workable. Phosphate esters are highly effective dispersing agents but they cannot be used in hand- and spray-lay-up applications due to interference with the curing mechanism.

Such reinforced plastic material as referred above, comprising a plastic material, filler and a dispersant are used in the industry as material for yacht interiors, boat hulls, wind turbines, train interiors and the like. The required plastic/filler/dispersant composition is generally placed into a mould and set. The addition of more filler to the composition with respect to the plastic material, cheapens the cost. However, if too much filler is added to the mix, the composition becomes too viscous and harder to work. Dispersants are also used for paints, inks and pigments.

Fillers not only reinforce the plastic for added strength, they can also offer other advantages. For example, a known filler, aluminium trihydrate is commonly used as a fire retardant filler. Upon heating of the plastic containing the fire retardant filler, the aluminium trihydrate decomposes to release water, therefore preventing the material from catching fire.

A number of references disclose dispersants for media such as plastics are summarised below.

U.S. Pat. No. 5,300,255 discloses dispersants containing a polyester derived from a hydroxycarboxylic acid with not more than 8 carbon atoms reacted with phosphorus pentoxide or sulphuric acid. The dispersants are useful in non-polar media, such as aromatic solvents and plastics.

U.S. Pat. No. 5,130,463 discloses dispersants containing a polyether/polyester derived from ε-caprolactone reacted with polyphosphoric acid.

U.S. Pat. No. 6,051,627 discloses dispersants including a polyether derived from ethylene oxide and propylene oxide reacted with polyphosphoric acid.

U.S. Pat. No. 4,281,071 discloses the use of an organophosphite for viscosity reduction of filled unsaturated polyester resin compositions.

Non-phosphate dispersants are disclosed in U.S. Pat. No. 3,332,793. U.S. Pat. No. 3,332,793 discloses suspending agents based upon carboxylic acid-terminated polyether/polyester chains subsequently reacted with a polyamine.

A number of documents disclose methoxy polyethylene glycol esters of polyacrylic acids and their use as dispersants.

EP 2 065 403 A discloses a process for making methoxy polyethylene glycol esters of polyacrylic acid, and their salts, as dispersants for gypsum, cement, and pigments in aqueous systems.

EP 1 061 089 A discloses methoxy polyethyleneglycol esters of polyacrylic acid, modified with organic amines, as cement super-plasticisers.

U.S. Pat. No. 5,840,114 discloses a methoxy polyethyleneglycol ester and methoxy polyethyleneglycol amide of a polycarboxylic acid prepared by direct esterification/amidation.

U.S. Pat. No. 5,476,885 discloses methoxy polyethyleneglycol esters of poly(meth)acrylic acids prepared from the reaction of the methoxy polyethyleneglycol with (meth)acrylic acid.

German Patent DE 3 325 738 discloses products made by the direct esterification of polyacrylic acid with $C_{16-18}$ alcohol ethoxylates.

WO 2010/127809 appears to relate to comb polymers where some of the comb "teeth" are polyesters prepared from diol and diacid constituents, in addition to polyether grafted chains.

EP 2208761 appears to refer to acrylic comb polymers directly reacted onto the surface of pigment or filler particles.

EP 2065403 appears to refer to similar grafted co-polymers, but also appear to stipulate a phosphorus-containing group in the structure.

There are two commonly known processes for polymerizing plastics material. The first method is that of heat curing. Heat curing involves the heating of the reaction mixture in order to initiate polymerization. In the heat cure process, phosphates are added as dispersants as they are highly efficient at lowering the viscosity of a plastic material/filler mix.

The second method is that of curing at an ambient temperature. At an ambient temperature, the reaction is initiated by metal initiators, commonly cobalt complex activators.

Dispersants are commonly used in unsaturated polyester composites to incorporate high levels of mineral fillers effectively whilst maintaining a workable viscosity.

In ambient temperature cure systems, the cross-linking reaction, using a peroxide radical source, is initiated by the use of cobalt complex activators. The cross linking reaction involves the linking of unsaturated polyesters to form chain polymers through polymerization. It is before this stage of the process that fillers and dispersants are added to the mixture.

The use of cobalt as a mineral catalyst is commonly used, however, other promoters are also used such as copper, manganese, zinc, zirconium and iron, when a cobalt free system is required. Such promoters can be used in conjunction with dimethylaniline, which has an effect of shortening the cure time of the polymerization process.

However, in ambient cure processes, phosphates cannot be used as dispersants.

Strongly acidic dispersants, such as phosphate esters, bind to such cobalt initiators and delay or prevent the cross-linking reaction from taking place.

Consequently, there is interest in alternative chemistries to provide effective dispersants in such systems which will not interfere in cross-linking reactions.

GB 887 241 discloses a range of dispersing agents designed for use in ambient-cure composites. These products, based upon polyether-polyester chains as a salt with a polyamine, have a good effect on wetting fillers, with only a minimal effect on cure retardation. However, the dispersants disclosed are inefficient as they comprise a single anchor group in the chain, therefore a high quantity of dispersant is needed to reduce the viscosity of a filler/plastic material mix.

Mineral fillers such as calcium carbonate are commonly added to unsaturated polyester resins to provide reinforcement, increase hardness and to lower overall formulation cost. Other mineral fillers such as alumina trihydrate, which endothermically decompose upon heating to liberate water, have a flame retardant effect when used as filler in unsaturated polyester composites. The adverse effect of adding a significant amount of filler is that the overall viscosity of the system increases. Dispersing agents are commonly used to wet out the dry filler during mixing, reduce this viscosity and make the formulation more workable. Phosphate esters are highly effective dispersing agents in a heat cure process but they cannot be used in hand and spray-lay-up applications due to interference with the curing mechanism.

During a cure process, unsaturated polyesters, which are supplied as a solution in styrene or other reactive monomer, are cured by a radical mechanism, initiated by an organic peroxide such as methyl ethyl ketone peroxide. The radicals thus created crosslink the double bonds in the polyester resin with the double bonds in the styrene diluent, forming a rigid 3-dimensional network. The starting point of the reaction is the decomposition of the organic peroxide, which can be initiated using a heated mould (heat-cure) or by using an organo-cobalt compound dissolved in the resin (ambient or cold cure).

Many dispersing agents for use in these systems are based upon phosphate esters. Phosphate groups bind tightly to basic filler surfaces, thus giving effective wetting and viscosity reduction. They also, however, bind tightly to the cobalt compound, thus inhibiting the breakdown of peroxide and retarding the cure of the composite. Consequently, phosphated dispersants cannot be used in metal activated ambient cured systems.

None of the known dispersants, as disclosed herein, are able to control the rate of curing and furthermore, there is a need for a dispersant that can be used in an ambient cure system and have a high dispersant activity with respect to lowering the viscosity of a plastics/filler mix therefore, enabling an increase in filler to be added to a plastics material, therefore lowering manufacturing costs.

SUMMARY OF THE INVENTION

The inventors of this invention have discovered that the compositions disclosed herein are capable of at least one of increasing a particulate solid load, provide enhanced curing performance, form improved dispersions and reduced viscosity.

The dispersants as disclosed below, have a high dispersant activity, therefore allows an increase in filler that can be added to a plastics mix due to an efficient reduction in viscosity of the mix. Furthermore, the dispersants below increase the homogeneity of a plastic/filler mix providing for a higher grade finished plastic product. The enhanced dispersant capabilities are further advantageous as the workability of the plastic/filler mix is improved, therefore making the plastic easier to manufacture.

The dispersants, as outlined below, can be used in both heat cure and ambient cure systems, however, are particularly suitable for ambient cure systems as they do not interfere with the mineral activators (i.e., cobalt activators) and therefore do not inhibit the ambient cure process.

The mole percent of repeat units represented by formula (1) below may be determined by a number of techniques well known to a person skilled in the art. The techniques include NMR, or by measurement of acid value by titration.

In one embodiment, the invention provides a polyacrylic-acid-containing graft copolymer (the copolymer may be random, blocky, or have random blocks). The general formula of the polyacrylic-acid containing graft copolymer (dispersant) is as follows:

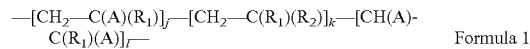

$$-[CH_2-C(A)(R_1)]_j-[CH_2-C(R_1)(R_2)]_k-[CH(A)-C(R_1)(A)]_l-\qquad \text{Formula 1}$$

j is formed from a polyacrylic acid monomer, k is formed from a dodecene or vinyl monomer of a different chain length and l is formed from a maleic acid monomer.

wherein
$R_1$ is H or $-CH_3$
$R_2$ is H or a $C_1$-$C_{16}$ alkyl, preferably $C_4$-$C_{10}$ alkyl
A is independently B, D or E
B is $-CO_2H$— acid side chain
D is $-CO-X-Q$
E is $-COO^-Y^+$— Neutralised salt.
X is $O^-$ or NH—
Q is $-(CHR_3-CH_2O)_n-R_4$
$R_3$ is independently H, $-CH_3$ or $-CH_2CH_3$ or mixtures thereof ($R_3$ is preferably H or $-CH_3$ or mixtures thereof, more preferably $R_3$ is H)
n is 3-45, especially 3-30
$R_4$ is a $C_1$-$C_{25}$, especially $C_1$-$C_{18}$, more especially $C_1$-$C_8$ alkyl
Y is an alkali metal, an alkaline earth metal or an ammonium salt derived from ammonia or an amine or alkanolamine or mixtures thereof.

j, k and l are the average number of repeating units within the graft copolymer.

j must be greater than 2 and desirably 3 or more.

k can be 0 when l=1 or greater than 1, or k can be 1 or greater than 1.

l can be 0 when k=1 or greater than 1, or l can be 1 or greater than 1.

The sum of j, k and l are such that the polymer has a molecular weight of between 1000 to 100,000.

In one embodiment, the ratio of j to k is 7:3 and l=0.

In one embodiment, the ratio of j to l is 1:1 and k=0.

The ratio of B to D to E is as follows:
B can be from 45 to 84.5%
D can be from 15 to 40%
E can be from 0.5 to 15%

As used herein the percentage ranges or ratios shown for B, D, E and F are on a mole percent basis.

$Y^+$ may independently be a metal cation (typically an alkali metal cation, an alkaline earth metal cation), or an ammonium cation (typically derived from ammonia or an amine such as an alkanolamine).

$R_3$ may be a mixture of —H and $-CH_3$, and typically with a ratio of —H to $-CH_3$ of no less than 75 mol %—H: 25 mol %—$CH_3$. In one embodiment $R_3$ may be a mixture of —H and $-CH_3$, and the ratio of —H to $-CH_3$ 85 mol %—H: 15 mol %—$CH_3$ In one embodiment, the invention provides a composition comprising a particulate solid (typically a pigment or filler), an organic medium (typically the organic medium may be a plastics material or an organic liquid) and a polyacrylic-acid containing copolymer comprising repeat units j+k, j+l or j+k+l whereby the copolymer must comprise j and have at least one repeat unit where A=B, at least one repeat unit where A=D and at least one repeat unit where A=E as described above.

In one embodiment, the invention provides a composition comprising a particulate solid, an organic medium and polyacrylic-acid containing copolymer comprising repeat units j+k, j+l or j+k+l whereby the copolymer must comprise j and have at least one repeat unit where A=B, at least one repeat unit where A=D and at least one repeat unit where A=E as described above.

In one embodiment, the invention provides for the use of the polyacrylic-acid containing copolymer comprising repeat units j+k, j+l or j+k+l whereby the copolymer must comprise j and have at least one repeat unit where A=B, at least one repeat unit where A=D and at least one repeat unit where A=E as described above as a dispersant, typically a particulate dispersant in a plastic material.

In one embodiment, the invention provides for the use of the polyacrylic-acid containing copolymer comprising repeat units j+k, j+l or j+k+l whereby the copolymer must comprise j and have at least one repeat unit where A=B, at least one repeat unit where A=D and at least one repeat unit where A=E as described above as a dispersant in the composition disclosed herein.

In some instances, a small amount of side reaction may occur when two repeat units next to each other both have A=B.

In this instance, two acid groups can combine to form an anhydride, thus:

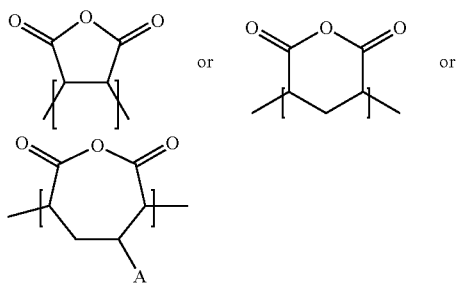

where A is defined above.

In one embodiment, from 0% to 10% of B can form anhydride groups in this manner.

In one embodiment, from 0% to 1% of B can form anhydride groups in this manner.

In one embodiment, when X is N—H, one B group can react with one D group to form an imide thus:

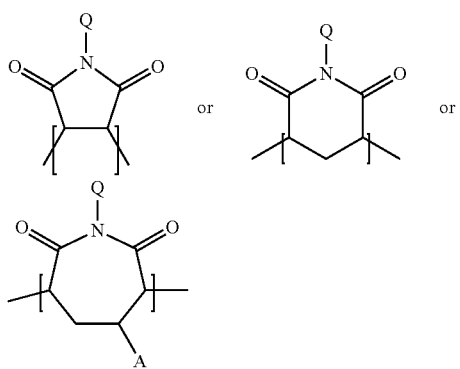

where A and Q are defined as above.

In one embodiment, from 0% to 100% of D groups can form imide groups when combined with a B group in this manner.

In one embodiment, the copolymer may contain up to 10% of a monomer selected from 2-acrylamido-2-methylpropane sulfonic acid, vinyl toluene, styrene, alkyl(meth)acrylates and mixtures thereof.

DETAILED DESCRIPTION OF THE INVENTION

The present invention provides a composition as disclosed herein above.

As used herein, the term "(meth)acryl" means acrylic or methacrylic units.

The polyacrylic acid-containing graft copolymer (dispersant) of the invention may have up to 10% of any of the repeat units j, k, and l replaced by a repeat unit selected from styrene, vinyl toluene, an alkyl(meth)acrylate, 2-acrylamido-2-methylpropane sulphonic acid, and mixtures thereof.

The alkyl(meth)acrylate may be methyl (meth)acrylate, butyl methacrylate, 2-methylpentyl(meth)acrylate, 2-propylheptyl(meth)acrylate, 2-butyloctyl(meth)acrylate, 2-ethylhexyl(meth)acrylate, octyl(meth)acrylate, nonyl(meth)acrylate, isooctyl(meth)acrylate, isononyl(meth)acrylate, 2-tert-butylheptyl(meth)acrylate, 3-isopropylheptyl(meth)acrylate, decyl(meth)acrylate, undecyl(meth)acrylate, 5-methylundecyl(meth)acrylate, dodecyl(meth)acrylate, 2-methyldodecyl (meth)acrylate, tridecyl(meth)-acrylate, 5-methyltridecyl (meth)acrylate, tetradecyl(meth)acrylate, pentadecyl(meth) acrylate, hexadecyl(meth)acrylate, 2-methylhexadecyl (meth)acrylate, heptadecyl(meth)acrylate, octadecyl(meth) acrylate, nonadecyl(meth)acrylate, eicosyl(meth)acrylate, or mixtures thereof.

The (poly)acrylic copolymer of the invention may have a number average molecular weight in the range of 1000 to 100,000, or 1000 to 50,000.

In one embodiment, each $R_1$ may independently be hydrogen, X may independently be —O—, Q may independently be —(CHR$_3$—CH$_2$O)$_m$R$_4$, $R_3$ may independently be —H or —CH$_3$, $R_4$ may independently be a hydrocarbyl group typically containing 1 to 8 carbon atoms, and $Y^+$ may independently be an ammonium cation.

In one embodiment, each $R_1$ may independently be hydrogen, X may independently be —NH—, Q may independently be —(CHR$_3$—CH$_2$O)$_m$R$_4$, $R_3$ may independently be —H or —CH$_3$, $R_4$ may independently be a hydrocarbyl group typically containing 1 to 8 carbon atoms, and $Y^+$ may independently be an ammonium cation.

In one embodiment, each $R_1$ may independently be hydrogen, X may independently be —O—, Q may independently be —(CHR$_3$—CH$_2$O)$_m$R$_4$, $R_3$ may be —H, $R_4$ may independently be a hydrocarbyl group containing 1 to 8 carbon atoms, and $Y^+$ may independently be an ammonium cation.

In one embodiment, each $R_1$ may independently be hydrogen, X may independently be —NH—, Q may independently be —(CHR$_3$—CH$_2$O)$_m$R$_4$, $R_3$ may be —H, $R_4$ may independently be a hydrocarbyl group containing 1 to 8 carbon atoms, and $Y^+$ may independently be an ammonium cation.

$R_2$ may independently be H or a $C_{1-16}$ alkyl group and preferably $C_{4-10}$ alkyl.

Examples of the monomers that may be used for the repeat unit k include, vinyl monomers such as ethene, propene, isobutylene, 1-hexene, 1-heptene, 1-octene, 2-methyl-1-heptene, 4-methyl-1-pentene, 1-nonene, 1-decene, 1-dodecene, 1-tetradecene, 1-hexadecene, 1-octadecene.

$R_4$ may be alkyl, aryl or alkaryl groups. The alkyl groups may be linear, branched or cyclic.

$R_4$ may, for instance, be methyl, ethyl, propyl, iso-propyl, n-butyl, i-butyl, t-butyl, pentyl, hexyl, heptyl, octyl, 2-ethylhexyl, nonyl, decyl, dodecyl, 2-methyldodecyl, tridecyl, 5-methyltridecyl, tetradecyl, pentadecyl, hexadecyl, 2-methylhexadecyl, heptadecyl, octadecyl, nonadecyl, eicosyl, or mixtures thereof.

When X is —O—, the X-Q group may be derived from a polyalkylene glycol mono-substituted alkylether, or mixtures thereof. The polyalkylene glycol mono-substituted alkylether may be a homopolymer or random or block copolymer, typically containing ethylene glycol. Typically, if X-Q contains a propylene glycol substituent, it is present as a random or block copolymer with ethylene glycol.

For example, the X-Q group may be derived from methoxy polyethylene glycol, ethoxy polyethylene glycol, propoxy polyethylene glycol, butoxy polyethylene glycol, methoxy polypropylene glycol, ethoxy polypropylene glycol, propoxy polypropylene glycol, or butoxy polypropylene glycol.

When X is —NH—, the X-Q group may be derived from a polyalkyleneoxide monoalkyl ether monoamine. The monoamine compounds of this type are commercially available as the Surfonamine® amines from Huntsman Corporation. Specific examples of Surfonamine® amines are B-60 (propylene oxide to ethylene oxide mole ratio of 9:1), L-100 (propylene oxide to ethylene oxide mole ratio of 3:19), B-200 (propylene oxide to ethylene oxide mole ratio of 29:6) and L-207 (propylene oxide to ethylene oxide mole ratio of 10:32), L200 (propylene oxide to ethylene oxide mole ratio of 3:41), L-300 (propylene oxide to ethylene oxide mole ratio of 8:58).

$Y^+$ may independently be a metal cation (typically an alkali metal cation, an alkaline earth metal cation), or an ammonium cation (typically derived from ammonia or an amine or an alkanolamine).

The metal cation may be lithium, sodium or potassium, magnesium, calcium, barium or mixtures thereof.

In one embodiment, $Y^+$ may independently be an ammonium cation. The ammonium cation may be derived from ammonia, a linear, or branched aliphatic amine, a cyclic amine, an aromatic amine, or aminoalcohol. In one embodiment, the aminoalcohol may be linear.

Examples of an amine that may be used to generate the ammonium cation include trimethylamine, triethylamine, tributylamine, aminoalkyl substituted heterocyclic compounds (such as 1-(3-aminopropyl)imidazole, 4-(3-aminopropyl)morpholine, 1-(2-aminoethyl)piperidine, 3,3-diamino-N-methyldipropylamine, 3,3'-aminobis(N,N-dimethylpropylamine), N,N-dimethyl-aminopropylamine, N,N-diethyl-aminopropylamine, N,N-dimethyl-aminoethylamine, morpholine, or mixtures thereof.

When $Y^+$ is an ammonium from an amine, the amine may be polyalkyleneoxide monoalkyl ether monoamine as described above.

When $Y^+$ is from an aminoalcohol, Y+ may be the residue of an aminoalcohol such as ethanolamine, isopropanolamine, diethanolamine, triethanolamine, diethylethanolamine, dimethylethanolamine, dibutylethanolamine, 3-amino-1,2-propanediol; serinol; 2-amino-2-methyl-1,3-propanediol; tris(hydroxymethyl)-aminomethane; 1-amino-1-deoxy-D-sorbitol; diisopropanolamine; N-methyl-N,N-diethanolamine; N,N,N',N'-tetrakis(2-hydroxypropyl)ethylenediamine, 2-amino-2-methyl-1-propanol, 2-dimethylamino-methyl-1-propanediol, 2-amino-2-ethyl-1,3-propanediol, 2-amino-1-butanol, or mixtures thereof.

The polyacrylic-acid containing graft copolymer may be prepared by processes known to a skilled person. For example, the polyacrylic-acid containing copolymer may be prepared by esterification or amidation of poly(meth)acrylic acid, or polymerisation of (meth)acrylic acid with (meth)acrylic esters and/or amides by any known polymerization technique or a combination of polymerization techniques using a bulk, solution, suspension or emulsion process. The polymerization may comprise of a radical, anionic, cationic, atom transfer or group transfer polymerization process or combinations thereof.

In one embodiment, the invention further provides for a composition comprising particulate solid (typically a pigment or filler), an organic medium (typically the organic medium may be a plastics material or an organic liquid) and a polyacrylic-acid containing copolymer comprising repeat units j+k, j+l or j+k+l whereby the copolymer must comprise j and have at least one repeat unit where A=B, at least one repeat unit where A=D and at least one repeat unit where A=E as described above.

In different embodiments, the invention provides a polyacrylic copolymer further having 0 mol % to 2 mol %, or 0 mol % to 1 mol %, or 0 mol % of an anhydride group.

In one embodiment, the invention provides for a compound obtained/obtainable by reacting poly(meth)acrylic acid (typically with a molecular weight between 300 and 90,000, or 300 and 45,000), either as an aqueous solution or a solid, and Q-X—H, as defined herein, in the ratio of between 5 and 95 parts by weight, to 95 parts and 5 parts by weight, in the presence of a catalyst, typically an acid catalyst, at a temperature between 120 and 200 Celsius, under an inert atmosphere, for a duration of between 2 hours and 72 hours, ensuring that water present in the reaction or generated during the reaction is removed. This generates an intermediate which is subsequently reacted with $Y^+$—H, where $Y^+$ is defined herein, in the ratio of from 1 part intermediate to 1 part $Y^+$—H by weight to 1 part intermediate to 0.00001 part $Y^+$—H, at a temperature between 50 and 100 Celsius, for a duration of between 0.5 to 24 hours, under an inert atmosphere in the absence of water.

In one embodiment, the invention provides for a polymer obtained/obtainable by a process comprising:

(i) reacting poly(meth)acrylic acid, either as an aqueous solution or a solid (typically having a molecular weight between 300 and 90000, or 300 and 45000), with an alcohol or amine, whilst simultaneously removing water from the reaction (for instance by distillation or other techniques known to a person skilled in the art); Where A=D, the $CO_2$—X-Q group above may be derived from the amine or alcohol. Typically the poly(meth)acrylic acid to alcohol or amine ratio may be 5 and 95 parts by weight, to 65 parts and 35 parts by weight;

(ii) reacting the product of step (i) with a compound capable of delivering a metal cation or ammonium salt (as described for $Y^+$ above) The mole ratio of the product of step (i) to the compound capable of delivering a metal cation or ammonium salt may range from 1 parts product of step (i) to 0.00001 parts of the compound capable of delivering a metal cation or ammonium salt, or 2 parts product of step (i) to 0.5 parts of the compound capable of delivering a metal cation or ammonium salt. A person skilled in the art will appreciate that where molecular weight of A where A=D, is very high there would be a low number of free acid groups available per unit weight of the total polymer. If a neutralizing species with a low molecular weight were used it would not require a large amount by weight to completely neutralize the acid groups. As a result of this the mole ratio of the product of step (i) to the compound capable of delivering a metal cation or ammonium salt may be as low as 1 parts product of step (i) to 0.00001 parts of the compound capable of delivering a metal cation or ammonium salt.

Step (i) above may be performed in the presence or absence of a catalyst, (typically in the presence of an acid catalyst).

The reaction temperature of step (i) may also range from 120° C. to 200° C. The reaction described in step (i) may be under an inert atmosphere. Step (i) may be performed for a duration of between 2 hours and 72 hours.

Step (ii) may be carried out at an elevated temperature ranging from 50° C. to 100° C. Step (ii) may be performed for a period of time ranging from 0.5 to 24 hours. Step (ii) may be performed in an inert or air atmosphere. In one embodiment, step (ii) may be carried out under an inert atmosphere and substantially free of water to free of water (typically free of water).

As used herein, the expression substantially free of water indicates that the reaction contains a minimal amount of water, for instance, contaminant or trace amounts not removed in step (i) of the process described above.

The product of step (ii) may have a weight average molecular weight of 1000 to 100,000, or 1000 to 50,000.

In one embodiment, the invention further provides for a composition comprising particulate solid (typically a pigment or filler), an organic medium (typically the organic medium may be a plastics material or an organic liquid) and a polyacrylic copolymer described by the product by process described above. The polyacrylic copolymer may be useful as a dispersant in the composition described herein.

The particulate solid (typically a pigment or filler) may have an average particle size by measured by light scattering measurements of from 10 nanometers to 10 microns, or 10 nanometers to 1, 2, 3, or 5 microns, or 20 nanometers to 1, 2, 3, or 5 microns in diameter.

INDUSTRIAL APPLICATION

In one embodiment, the polyacrylic copolymer disclosed herein is a dispersant, typically used for dispersing particulate solid materials.

The polyacrylic copolymer disclosed herein, in different embodiments, is present in the composition of the invention in a range selected from 0.1 to 50 w. %, or 0.25 to 35 wt. %, and 0.5 to 30 wt. %.

The particulate solid present in the composition may be any inorganic or organic solid material which is substantially insoluble in the organic medium at the temperature concerned and which it is desired to stabilize in a finely divided form therein. The particulate solids may be in the form of a granular material, a fibre, a platelet or in the form of a powder, often a blown powder. In one embodiment, the particulate solid is a filler.

Examples of suitable solids are pigments, extenders, fillers, blowing agents and flame retardants for plastics materials; dyes, especially disperse dyes; metals; particulate ceramic materials and magnetic materials for ceramics, piezoceramic printing, abrasives, capacitors, or fuel cells, ferrofluids; organic and inorganic nanodisperse solids; fibres such as wood, paper, glass, steel, or carbon and boron for composite materials.

Examples of inorganic pigments include metallic oxides, such as titanium dioxide, rutile titanium dioxide and surface coated titanium dioxide, titanium oxides of different colours such as yellow and black, iron oxides of different colours such as yellow, red, brown and black, zinc oxide, zirconium oxides, aluminium oxide, oxymetallic compounds, such as bismuth vanadate, cobalt aluminate, cobalt stannate, cobalt zincate, zinc chromate and mixed metal oxides of two or more of manganese, nickel, titanium, chromium, antimony, magnesium, cobalt, iron or aluminium, Prussian blue, vermillion, ultramarine, zinc phosphate, zinc sulphide, molybdates and chromates of calcium and zinc, metal effect pigments, such as aluminium flake, copper, and copper/zinc alloy, pearlescent flake such as lead carbonate and bismuth oxychloride.

Inorganic solids include extenders and fillers such as ground and precipitated calcium carbonate, calcium sulphate, calcium oxide, calcium oxalate, calcium phosphate, calcium phosphonate, barium sulphate, barium carbonate, magnesium oxide, magnesium hydroxide, natural magnesium hydroxide or brucite, precipitated magnesium hydroxide, magnesium carbonate, dolomite, aluminium trihydroxide, aluminium hydroperoxide or boehmite, calcium and magnesium silicates, aluminosilicates including nanoclays, kaolin, montmorillonites including bentonites, hectorites and saponites, mica, talc including muscovites, phlogopites, lepidolites and chlorites, chalk, synthetic and precipitated silica, fumed silica, metal fibres and powders, zinc, aluminium, glass fibres, refractory fibres, carbon black, including single- and multi-walled carbon nanotubes, reinforcing and non-reinforcing carbon black, graphite, Buckminsterfullerenes, asphaltene, graphene, diamond, alumina, quartz, silica gel, wood flour, wood flake including soft and hard woods, saw dust, powdered paper/fibre, cellulosic fibres, such as kenaf, hemp, sisal, flax, cotton, cotton linters, jute, ramie, rice husk or hulls, raffia, typha reed, coconut fibre, coir, oil palm fibre, kapok, banana leaf, caro, curaua, henequen leaf, harakeke leaf, abaca, sugar cane bagasse, straw, bamboo strips, wheat flour, MDF and the like, vermiculite, zeolites, hydrotalcites, fly ash from power plants, incinerated sewage sludge ash, pozzolanes, blast furnace slag, asbestos, chrysotile, anthophylite, crocidolite, wollastonite, attapulgite and the like, particulate ceramic materials such as alumina, zirconia, titania, ceria, silicon nitride, aluminium nitride, boron nitride, silicon carbide, boron carbide, mixed silicon-aluminium nitrides and metal titanates; particulate magnetic materials such as the magnetic oxides of transition metals, often iron and chromium, e.g., gamma-$Fe_2O_3$, $Fe_3O_4$, and cobalt-doped iron oxides, ferrites, e.g., barium ferrites; and metal particles, for instance, metallic aluminium, iron, nickel, cobalt, copper, silver, gold, palladium, and platinum and alloys thereof.

Other useful solid materials include flame retardants such as pentabromodiphenyl ether, octabromodiphenyl ether, decabromodiphenyl ether, hexabromocyclododecane, ammonium polyphosphate, melamine, melamine cyanurate, antimony oxide and borates.

The organic medium present in the composition of the invention in one embodiment is a plastics material and in another embodiment an organic liquid. The organic liquid may be a non-polar or a polar organic liquid, although a polar organic liquid is typically used. By the term "polar" in relation to the organic liquid, it is meant that an organic liquid is capable of forming moderate to strong bonds as described in the article entitled "A Three Dimensional Approach to Solubility" by Crowley et al. in the Journal of Paint Technology, Vol. 38, 1966, at page 269. Such organic liquids, generally, have a hydrogen bonding number of 5 or more as defined in the abovementioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40, and these liquids all fall within the scope of the term polar organic liquid, as used herein.

In one embodiment, polar organic liquids include dialkyl ketones, alkyl esters of alkane carboxylic acids and alkanols, especially such liquids containing up to, and including, a total of 6 or 8 carbon atoms. As examples of the polar organic liquids include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxypropyl acetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran. In one embodiment, solvents are alkanols, alkane carboxylic acids and esters of alkane carboxylic acids.

Examples of organic liquids which may be used as polar organic liquids are film-forming resins. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of resins include short oil alkyd/melamine-formaldehyde, polyester/melamine-formaldehyde, thermosetting acrylic/melamine-formaldehyde, long oil alkyd, polyether polyols and multi-media resins such as acrylic and urea/aldehyde.

The organic liquid may be a polyol, that is to say, an organic liquid with two or more hydroxy groups. In one embodiment, polyols include alpha-omega diols or alpha-omega diol ethoxylates.

In one embodiment, non-polar organic liquids are compounds containing aliphatic groups, aromatic groups or mixtures thereof. The non-polar organic liquids include non-halogenated aromatic hydrocarbons (e.g., toluene and xylene), halogenated aromatic hydrocarbons (e.g., chlorobenzene, dichlorobenzene, chlorotoluene), non-halogenated aliphatic hydrocarbons (e.g., linear and branched aliphatic hydrocarbons containing six or more carbon atoms, both fully and partially saturated), halogenated aliphatic hydrocarbons (e.g., dichloromethane, carbon tetrachloride, chloroform, trichloroethane) and natural non-polar organics (e.g., vegetable oil, sunflower oil, linseed oil, terpenes and glycerides).

In one embodiment, the organic liquid includes at least 0.1% by weight, or 1% by weight or more of a polar organic liquid based on the total organic liquid.

In one embodiment, the organic liquid is free of water.

The plastics material may be a thermosetting resin or a thermoplastic resin. The thermosetting resins useful in this invention include resins, which undergo a chemical reaction when heated, catalysed, or subject to ultra-violet, laser light, infra-red, cationic, electron beam, or microwave radiation and become relatively infusible. Typical reactions in thermosetting resins include oxidation of unsaturated double bonds, reactions involving epoxy/amine, epoxy/carbonyl, epoxy/hydroxyl, reaction of epoxy with a Lewis acid or Lewis base, polyisocyanate/hydroxy, amino resin/hydroxy moieties, free radical reactions or polyacrylate, cationic polymerization of epoxy resins and vinyl ether and condensation of silanol. Examples of unsaturated resins include polyester resins made by the reaction of one or more diacids or anhydrides with one or more diols. Such resins are commonly supplied as a mixture with a reactive monomer such as styrene or vinyltoluene and are often referred to as orthophthalic resins and isophthalic resins. Further examples include resins using dicyclopentadiene (DCPD) as a co-reactant in the polyester chain. Further examples also include the reaction products of bisphenol A diglycidyl ether with unsaturated carboxylic acids such as methacrylic acid, subsequently supplied as a solution in styrene, commonly referred to as vinyl ester resins.

Polymers with hydroxy functionality (frequently polyols) are widely used in thermosetting systems to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including both monomeric aliphatic diisocyanates, monomeric aromatic diisocyanates and their polymers. Typical aliphatic diisocyanates include hexamethylene diisocyanate, isophorone diisocyanate and hydrogenated diphenylmethane diisocyanate. Typical aromatic isocyanates include toluene diisocyanates and diphenylmethane diisocyanates.

The plastics material such as a thermoset resin may be useful for parts in boat hulls, baths, shower trays, seats, conduits and bulkheads for trains, trams, ships aircraft, body panels for automotive vehicles and truck beds.

If desired, the compositions containing plastic material may contain other ingredients, for example dispersants other than the compound of the present invention, antifogging agents, nucleators, blowing agents, flame retardants, process aids, surfactants, plasticisers, heat stabilizers, UV absorbers, anti-oxidants, fragrances, mould release aids, anti-static agents, anti-microbial agents, biocides, coupling agents, lubricants (external and internal), impact modifiers, slip agents, air release agents and viscosity depressants.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The composition may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example, by ball milling, bead milling, gravel milling, high shear mixing or plastic milling until the dispersion is formed. Alternatively, the solid may be treated to reduce its particle size independently or in admixture with either, the organic medium or the dispersant, the other ingredient or ingredients then being added and the mixture being agitated to provide the composition.

In one embodiment, the composition of the present invention is suited to liquid dispersions. In one embodiment, such dispersion compositions comprise: (a) 0.5 to 40 parts of a particulate solid, (b) 0.5 to 30 parts of a polyacrylic-acid-containing copolymer disclosed herein, and (c) 30 to 99 parts of an organic medium; wherein all parts are by weight and the amounts (a)+(b)+(c)=100.

In one embodiment, component a) includes 0.5 to 40 parts of a pigment and such dispersions are useful as mill-bases.

If a composition is required, including a particulate solid and a polyacrylic-acid-containing copolymer disclosed herein in dry form, the organic liquid is typically volatile so that it may be readily removed from the particulate solid by a simple separation means such as evaporation. In one embodiment, the composition includes the organic liquid.

If the dry composition consists essentially of the polyacrylic-acid-containing copolymer disclosed herein and the particulate solid, it typically contains at least 0.2%, at least 0.5% or at least 1.0% the polyacrylic-acid-containing copolymer disclosed herein based on weight of the particulate solid. In one embodiment, the dry composition contains not greater than 100%, not greater than 50%, not greater than 20%, or not greater than 10% by weight of the polyacrylic-acid-containing copolymer disclosed herein based on the weight of the particulate solid. In one embodiment, the polyacrylic-acid-containing copolymer disclosed herein is present at 0.6 wt. % to 8 wt. %.

As disclosed hereinbefore, the compositions of the invention are suitable for preparing mill-bases wherein the particulate solid is milled in an organic liquid in the presence of a polyacrylic-acid-containing copolymer disclosed herein, or salts thereof.

Thus, according to a still further embodiment of the invention, there is provided a mill-base including a particulate solid, an organic liquid and polyacrylic-acid-containing copolymer disclosed herein, or salts thereof.

Typically, the mill-base contains from 20 to 70% by weight particulate solid based on the total weight of the mill-base. In one embodiment, the particulate solid is not less than 10 or not less than 20% by weight of the mill-base. Such mill-bases may optionally contain a binder, added either before or after milling. The binder is a polymeric material capable of binding the composition on volatilisation of the organic liquid.

Binders are polymeric materials including natural and synthetic materials. In one embodiment, binders include poly (meth)acrylates, polystyrenics, polyesters, polyurethanes, alkyds, polysaccharides such as cellulose, and natural proteins such as casein. In one embodiment, the binder is present in the composition at more than 100% based on the amount of particulate solid, more than 200%, more than 300% or more than 400%.

The amount of optional binder in the mill-base can vary over wide limits but is typically not less than 10%, and often not less than 20% by weight of the continuous/liquid phase of the mill-base. In one embodiment, the amount of binder is not greater than 50% or not greater than 40% by weight of the continuous/liquid phase of the mill-base.

The amount of dispersant in the mill-base is dependent on the amount of particulate solid but is typically from 0.5 to 5% by weight of the mill-base.

Dispersions and mill-bases made from the composition of the invention are particularly suitable for use in non-aqueous and solvent free formulations in which energy curable systems (ultra-violet, laser light, infra-red, cationic, electron beam, microwave) are employed with monomers, oligomers, etc., or a combination present in the formulation. They are particularly suitable for use in plastics; polyol and plastisol dispersions; non-aqueous ceramic processes, especially tape-casting, gel-casting, doctor-blade, extrusion and injection moulding type processes, a further example would be in the preparation of dry ceramic powders for isostatic pressing; composites such as sheet moulding and bulk moulding compounds, resin transfer moulding, pultrusion, hand-lay-up and spray-lay-up processes, matched die moulding; construction materials like casting resins, and plastics materials. They are useful in the surface modification of pigments and fillers to improve the dispersibility of dry powders used in the above applications. Further examples of coating materials are given in Bodo Muller, Ulrich Poth, Lackformulierung und Lackrezeptur, Lehrbuch fr Ausbildung und Praxis, Vincentz Verlag, Hanover (2003) and in P. G. Garrat, Strahlenhartung, Vincentz Verlag, Hanover (1996). Examples of printing ink formulations are given in E. W. Flick, Printing Ink and Overprint Varnish Formulations—Recent Developments, Noyes Publications, Park Ridge N.J., (1990) and subsequent editions.

In one embodiment, the composition of the invention further includes one or more additional known dispersants.

The following examples provide illustrations of the invention. These examples are non exhaustive and are not intended to limit the scope of the invention. All chemicals were purchased from Aldrich except where stated.

EXAMPLES

Comparative Example A (COMA) is a compound made by the process described in GB 887 241, Example 1.

Intermediate 1

Poly(acrylic-co-maleic acid) (1:1 mole ratio, MW 3000, Ex Sigma Aldrich, 50% active in water, 45.7 parts) and polyethyleneglycol monomethyl ether (MW 500, Ex Ineos, 60.77 parts) and Orthophosphoric acid (Ex Sigma Aldrich, 0.25 parts) are charged to a reaction flask and heated, under a nitrogen blanket to 150° C. and stirring maintained for 23 hours, giving a Clear orange liquid.

Intermediate 2

Poly(acrylic-co-maleic acid) (1:1 mole ratio, MW 3000, Ex Sigma Aldrich, 50% active in water, 17.74 parts) and Surfonamine® L-100 ether (Ex Huntsman, 47.18 parts) and Orthophosphoric acid (Ex Sigma Aldrich, 0.17 parts) are charged to a reaction flask and heated, under a nitrogen blanket to 150° C. and stirring maintained for 22 hours, giving an orange solid.

Intermediate 3

Poly(acrylic acid-co-dodecene) (7:3 mole ratio, MW 1920, Ex Lubrizol, 19.28 parts) and polyethyleneglycol monomethyl ether (MW 500, Ex Ineos, 28.65 parts) are charged to a reaction flask and heated, under a nitrogen blanket to 120° C. until homogeneous. Orthophosphoric acid (Ex Sigma Aldrich, 0.14 parts) is added. The reaction temperature is increased to 180° C. and stirring maintained for 22 hours, giving a clear yellow liquid.

Preparative Example 1 (EX 1)

Intermediate 1 (32.1 parts) and triethanolamine (Ex Sigma Aldrich, 1.5 parts) is charged to a reaction flask and heated to 70° C. under a nitrogen blanket. Left to stir for 2 hours, giving a viscous clear brown liquid. This is dispersant 1.

Preparative Example 2 (EX 2)

Intermediate 2 (32.6 parts) and triethanolamine (Ex Sigma Aldrich, 0.87 parts) is charged to a reaction flask and heated to 70° C. under a nitrogen blanket. Left to stir for 2 hours, giving a brown solid. This is dispersant 2.

Preparative Example 3 (EX 3)

Intermediate 3 (17.31 parts) and triethanolamine (Ex Sigma Aldrich, 0.52 parts) is charged to a reaction flask and heated to 70° C. under a nitrogen blanket. Left to stir for 2 hours, giving a viscous clear yellow liquid. This is dispersant 3.

Dispersion Evaluation

All of the examples which are not already 50% active are diluted to 50% by the addition of a 1:1 mixture of Dowanol PM and Dowanol PMA.

Crystic 471 (unsaturated polyester resin (Ex Scott Bader Co, 50 g) and each example dispersant (1 part active dispersant) is charged to a stainless steel mill-pot and set to stir briskly for two minutes. Carbital 110 (calcium carbonate, ex Imerys Performance Minerals, 100 parts) filler is added gradually until substantially all of the filler is charged. The mixture is then stirred at 3000 rpm for 15 minutes to form a paste. The paste is evaluated for viscosity.

Each paste sample is measured on a TA Instruments AR2000 Controlled Stress rheometer in flow measurement mode, using a 40 mm stainless steel cross-hatched plate with a 1 mm gap. The experiment is a stepped-flow measurement at 25° C. The samples are sheared at rates of 0.2 s$^{-1}$ to 160 s$^{-1}$. The viscosity data (Pas) obtained is as follows

| Shear Rate | Example Viscosity PaS | | | | |
|---|---|---|---|---|---|
| (1/s) | Control | COM | EX1 | EX2 | EX3 |
| 0.2811 | 266.4 | 30.93 | 43.29 | 24.14 | 37.52 |
| 0.4999 | 376.8 | 27.29 | 30.83 | 20.65 | 28.66 |
| 0.8889 | 565.8 | 24.11 | 23.38 | 17.78 | 22.88 |
| 1.581 | 709.6 | 22.44 | 19.31 | 16.11 | 19.73 |
| 2.811 | 746.8 | 22.62 | 17.81 | 15.98 | 19.05 |
| 4.999 | 691.9 | 24.79 | 18.51 | 17.72 | 20.94 |
| 8.889 | 481.5 | 27.89 | 21.2 | 21.51 | 24.8 |
| 15.81 | 312.1 | 29.54 | 22.6 | 23.95 | 27.75 |
| 28.11 | 196.5 | 29.97 | 21.62 | 20.75 | 27.88 |
| 49.99 | 35.12 | 30.08 | 19.05 | 17.46 | 29.2 |
| 88.89 | 3.327 | 22.5 | 14.52 | 13.84 | 15.42 |

Footnotes:
Control does not contain a dispersant.

Typically, an additive which has superior performance over comparative examples, displays a lower viscosity for the majority of data points over the equivalent data points for the comparative example.

Curing Data:

All of the examples, which are not already 50% active, are diluted to 50% by the addition of a 1:1 mixture of Dowanol PM and Dowanol PMA.

Crystic® 471 PALV unsaturated polyester resin (Ex Scott Bader Co) and the example (0.175 parts active dispersant) are mixed thoroughly in a glass vial. A thermocouple probe is used to measure the temperature of the mixture. Once a stable temperature is obtained methylethylketone peroxide (Ex Aldrich) is added (0.4 parts) and the contents of the vial mixed well. The temperature of the mixture is sampled once per minute over a 60 minute period, providing a measure of the speed of onset of curing and a peak temperature exotherm. In general terms, the higher and sooner the peak exotherm occurs then the more efficient the curing is. A peak exotherm, which is significantly lowered or delayed, is displaying interference in the curing mechanism from the dispersant used. In these results, a candidate formulation is judged to be a PASS if the peak exotherm is greater than 50 Celsius and the peak exotherm occurs before a 40 minute period has elapsed. If the candidate formulation has a peak exotherm less than 50 Celsius and/or the exotherm occurs after a 40 minute period has elapsed, the candidate is judged as a FAIL.

The results for the examples are:

| | Set 1 | | |
|---|---|---|---|
| Agents | Peak Exotherm (° C.) | Time to Peak Exotherm (minutes) | Result for each candidate |
| Control-no agent | 105 | 26 | PASS |
| COM | 76 | 32 | PASS |
| EX1 | 72 | 31 | PASS |
| EX2 | 115 | 24 | PASS |
| EX3 | 90 | 31 | PASS |

The data obtained from the tests indicates that the compositions of the invention have acceptable curing performance and form improved dispersions over the compositions containing a comparative example dispersant.

Each of the documents, referred to above, is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition, referred to herein, should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition comprising particulate solid selected from a pigment or a filler, an organic medium selected from a plastics material or an organic liquid and a polyacrylic-acid-containing copolymer comprising the general formula;

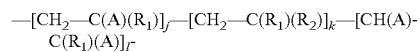

wherein;
$R_1$ is H or —$CH_3$;
$R_2$ is H or a $C_1$-$C_{16}$ alkyl;
A is independently B, D or E;
B is —$CO_2H$;
D is —CO—X-Q;
E is —COO$^-$Y$^+$;
j, k and l are the average number of repeating units within the graft copolymer j must be greater than 2
k is 0 when l=1 or greater than 1, or k is 1 or greater than 1
l is 0 when k=1 or greater than 1, or l is 1 or greater than 1
X is O— or NH—;
Q is —(CHR$_3$—CH$_2$O)$_n$—R$_4$;

$R_3$ is independently H, —$CH_3$ or —$CH_2CH_3$ or a mixture thereof;

n is 3-45

$R_4$ is $C_{1-25}$ alkyl;

Y is an alkali metal, an alkaline earth metal, an ammonium salt derived from ammonia, an amine, an alkanolamine or a mixture thereof, wherein the polyacrylic-acid-containing copolymer comprises repeat units j+k, j+l or j+k+l whereby the copolymer must comprise j and have at least one repeat unit where A=B, at least one repeat unit A=D and at least one repeat unit where A=E.

2. A composition as claimed in claim 1 wherein the ratio of j to k is 7:3 and l=0.

3. A composition as claimed in claim 1 wherein the ratio of j to l is 1:1 and k=0.

4. A composition as claimed in claim 1 wherein n is 3-30.

5. A composition as claimed in claim 1 wherein $R_4$ is $C_1$-$C_{18}$.

6. A composition as claimed in claim 1 wherein $R_4$ is $C_1$-$C_8$.

7. A composition as claimed in claim 1 wherein the ratio of B:D:E is as follows:

B is from 45 to 84.5%;

D is from 15 to 40%; and,

E is from 0.5 to 15%.

8. A composition as claimed in claim 1 wherein said polyacrylic copolymer has a number average molecular weight in the range of 1000 to 100,000.

9. A composition as claimed in claim 1 wherein said polyacrylic copolymer is present 0.25 wt % to 35 wt % of the composition.

10. A composition as claimed in claim 1 wherein the organic medium is an organic liquid or a plastic material.

11. A composition as claimed in claim 10 wherein said organic liquid comprises at least 0.1 wt % of a polar organic liquid based on the total organic liquid.

12. A composition as claimed in claim 1 wherein said plastic material is a thermoset resin.

13. A composition as claimed in claim 1 wherein said polyacrylic copolymer is pigment dispersant in said plastic material.

14. A composition as claimed in claim 1 wherein said polyacrylic copolymer has a number average molecular weight in the range of 1000 to 50,000.

15. A composition as claimed in claim 1 wherein said polyacrylic copolymer is present 0.5 wt % to 30 wt % of the composition.

* * * * *